UNITED STATES PATENT OFFICE.

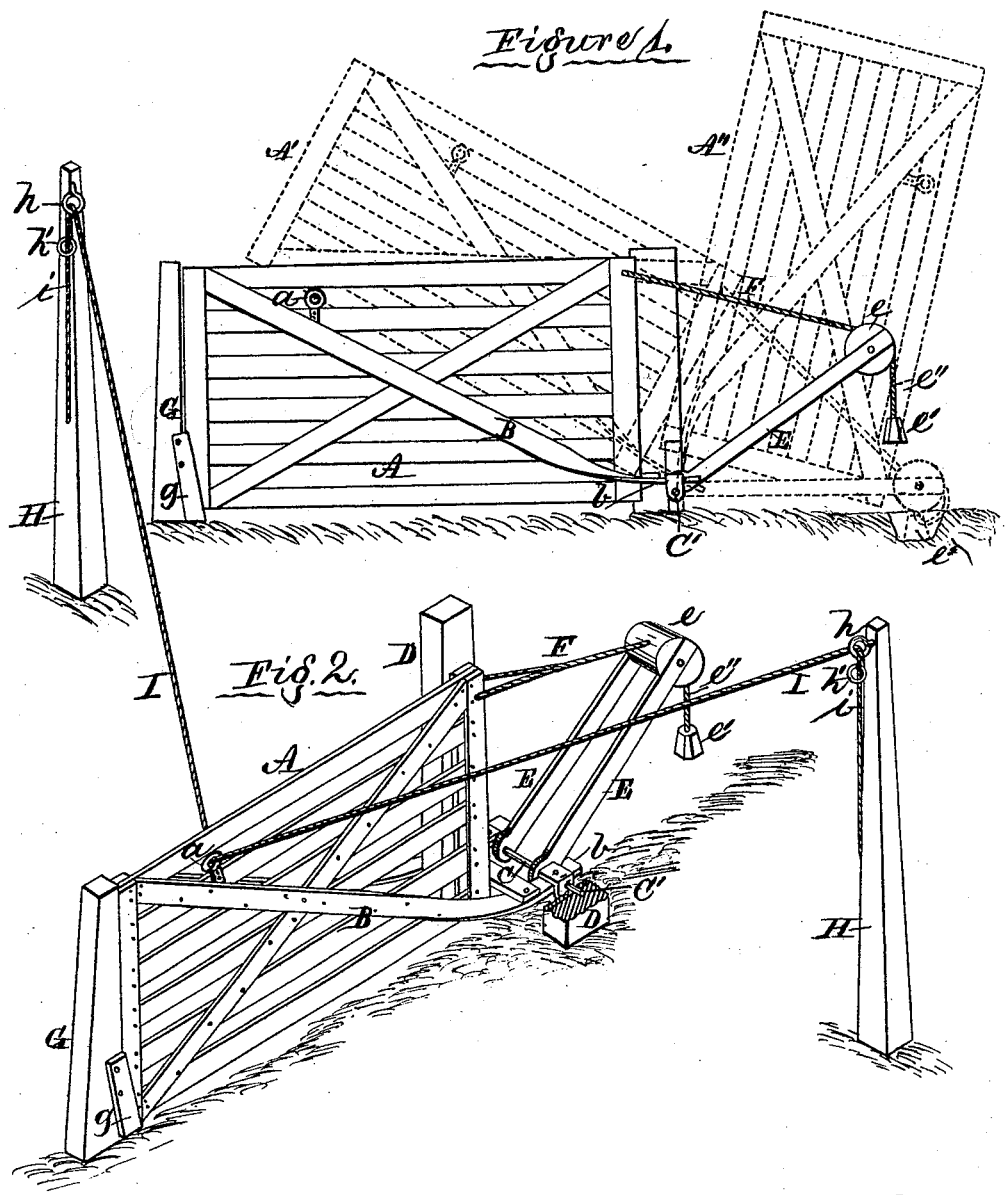

DAVID BABBITT, OF CAMERON, ILLINOIS, ASSIGNOR OF ONE-HALF HIS RIGHT TO WILLIAM J. GOULD, OF SAME PLACE.

IMPROVEMENT IN FARM-GATES.

Specification forming part of Letters Patent No. 185,206, dated December 12, 1876; application filed September 2, 1876.

*To all whom it may concern:*

Be it known that I, DAVID BABBITT, of Cameron, in the county of Warren and State of Illinois, have invented certain new and useful Improvements in Farm-Gates; and I do hereby declare that the following is a full, clear, and exact description thereof, which will enable others skilled in the art to which it appertains to make and use the same, reference being had to the accompanying drawings, and to letters of reference marked thereon, which form a part of this specification.

The nature of my invention relates to improvements in farm-gates of that class which are operated by a cord, and are hinged so as to be turned upward at one end to be opened; and the invention consists, first, in constructing and arranging the hinging devices so as to raise the gate above snow or other obstructions, and carry it back and out of the way when it is opened; second, in combining a variable weight with the gate and operating-cord in such manner that the weight may be made to assist in lifting the gate through the difficult part of its described arc in opening, and be made to assist in resisting its increased velocity through the last part of its described arc in closing, all as hereinafter fully described.

In the accompanying drawings, Figure 1 is a side elevation of a gate embodying my invention. Fig. 2 is a perspective view.

In both figures the near one of the posts between which the gate is hung is shown broken away.

Referring to the parts by letters, letter A represents a gate, which may be of any ordinary construction. The braces B have extended ends $b$, connected by a bar, C, the ends of which project to form journals C', which are provided with suitable bearings in the posts D, and constitute the journals on which the gate is operated. E E are bars, journaled on the bar C, and, projecting rearward, carry on their distal ends the weight $e$, from which a cord, F, extends to the upper edge of the gate A, and which is of such length as to sustain the bars E at an angle of about thirty degrees when the gate is closed. $e'$ is a weight suspended from the weight $e$ by a cord, $e''$. G is the latch-post, and has side bars $g$ secured to its lower end, and projecting at their lower ends to form ledges, between which the lower end of the gate rests when closed. H H are posts set at right angles to and some distance from the gate A, and in such position that the rings $h$ in their upper ends are about in a line with the journals C'. I is a cord, its central portion passed through a ring, $a$, attached to the gate A, and its ends $i$ passed through the rings $h$, from which they hang pendent, as shown in the drawings, and are provided with rings or stops $h'$.

The operation is as follows: In approaching the gate, on horseback, afoot, or in any kind of vehicle, the adjacent pendent end $i$ of the cord I may be taken hold of and drawn (the ring $h'$ on its farther end acting as a stop) to raise or turn the gate upward on the journals C' by the straightening of the cord I. The weights $e$ $e'$ both assist in starting and moving the gate from its horizontal position, and through that part of its path where most force is required. When an elevation of about ten degrees is reached, the weight $e'$ strikes the ground J, and when an elevation of thirty degrees, or thereabout, is reached, as shown by dotted lines A' at Fig. 1, the weight $e$ also strikes the ground, and from thence upward to near a position where the gravity of the gate will carry it over the movement is easy, and may be rapid enough to create momentum sufficient to carry it over when the cord I becomes straight, and at which instant it should be slackened to allow the gate to fall to the position shown by dotted lines A'' at Fig. 1. A reverse operation occurs in closing the gate, the weights serving to prevent the gate dropping too rapidly to its closed position.

The extended bars $b$ will raise the gate when opening and opened, as shown by dotted lines at Fig. 1, and raise it above obstructions, as well as enable it to be thrown past perpendicular, to sustain it when open, and throw it back of the posts D and out of the way, when open, of passing vehicles, as shown by dotted lines at Fig. 1. The eye $a$ is set above the braces B, which are true diagonals to the gate, so that when the cord I is stretched, the weight of the gate will hang toward its closed position.

What I claim as new, and desire to secure by Letters Patent, is—

1. In combination with the gate A, the diagonal brace B, having the rearward extension b, pivoted to the post D by the journal C', substantially as and for the purpose specified.

2. The pivoted bars E, having weight e on their outer ends, and arranged to operate by means of cord F and weighted cords e' e'', with the gate A, substantially as and for the purpose specified.

3. The pivoted bars E, having weight e on their outer ends, and arranged to operate with the cord F in opening and closing the gate A, substantially as and for the purpose specified.

4. The pivoted bars E, having weight e on their outer ends, and arranged to operate with the cords F and I in opening and closing the gate A, substantially as and for the purpose specified.

In testimony that I claim the foregoing as my own I affix my signature in presence of two witnesses.

DAVID BABBITT.

Witnesses:
A. KELLY,
ISAAC WILSON.